United States Patent [19]

Ducloux et al.

[11] 4,035,345

[45] * July 12, 1977

[54] THERMOSETTING BIS-IMIDE COMPOSITIONS

[75] Inventors: Maurice Ducloux, Alle a Irigny; Pierre Ledru, Lyon, both of France

[73] Assignee: Rhone-Poulenc S.A., Paris, France

[ * ] Notice: The portion of the term of this patent subsequent to Jan. 23, 1990, has been disclaimed.

[21] Appl. No.: 156,033

[22] Filed: June 23, 1971

[30] Foreign Application Priority Data

June 26, 1970 France .................. 70.23780

[51] Int. Cl.² ............................... C08G 69/26
[52] U.S. Cl. ..................... 260/78 UA; 260/47 CZ; 260/47 UA; 260/63 N; 260/65; 260/824 R; 260/857 UN; 428/435; 428/474; 526/11.1; 526/11.2
[58] Field of Search ...... 260/78 UA, 47 CZ, 47 CP

[56] References Cited

U.S. PATENT DOCUMENTS

| | | | |
|---|---|---|---|
| 2,818,405 | 12/1957 | Kovacic | 260/78 UA |
| 3,533,996 | 10/1970 | Grundschober et al. | 260/78 UA |
| 3,562,223 | 2/1971 | Bargain et al. | 260/78 UA |
| 3,637,901 | 1/1972 | Bargain et al. | 260/78 UA |
| 3,652,511 | 3/1972 | Vincent et al. | 260/78 UA |
| 3,712,933 | 1/1973 | Ducloux et al. | 260/78 UA |
| 3,717,615 | 2/1973 | Holub et al. | 260/78 UA |
| 3,761,430 | 9/1973 | Witzel | 260/78 UA |

Primary Examiner—Harold D. Anderson
Attorney, Agent, or Firm—Stevens, Davis, Miller & Mosher

[57] ABSTRACT

A thermosetting composition is provided which comprises the reaction product of (a) at least one N,N'-bis-imide of an unsaturated dicarboxylic acid, of general formula

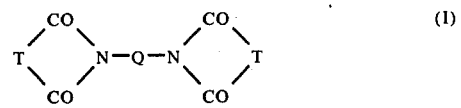

in which T represents a divalent organic radical containing a carbon-carbon double bond and Q is a divalent organic radical of 2 to 30 carbon atoms, (b) at least one polyamine of general formula

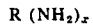

in which $x$ is an integer at least equal to 2, and R represents an organic radical of valency $x$, the bis-imide being present in an amount of 0.55 to 25 mols per molar $-NH_2$ group of the polyamine, and (c) at least one monomer other than a bis-imide of formula (I), which contains a carbon-carbon double bond and is heat-polymerizable.

23 Claims, No Drawings

THERMOSETTING BIS-IMIDE COMPOSITIONS

The present invention relates to thermosetting compositions based on bis-imides.

French Pat. No. 1,188,634 describes resinous thermoplastic products obtained from N,N'-bis-maleimides and a cyclopentadienone or lactone possessing two conjugated double bonds in the ring. Thermosetting resins have been described (see French Pat. No. 1,555,564) which can be obtained by reacting an N,N'-bis-imide of an unsaturated dicarboxylic acid of general formula

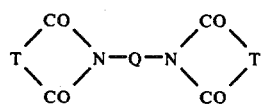 (I)

in which T represents a divalent radical containing a carbon-carbon double bond and Q is a divalent radical possessing at least two carbon atoms, with a di-primary diamine of general formula

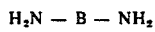 (II)

in which B represents a divalent radical which does not possess more than 30 carbon atoms. The amounts of N,N'-bis-imide and of diamine are chosen so that the ratio $$\frac{\text{number of mols of bis-imide (I)}}{\text{number of mols of diamine (II)}}$$

is at least equal to 1 but generally less than 50. Heat-stable resins can be obtained therefrom which are remarkably resistant to severe heat exposure. This French Pat. No. 1,555,564 also discloses that these resins can be prepared in bulk by heating the previously intimately mixed reagents, or in an inert polar diluent such as dimethylformamide, N-methylpyrrolidone or dimethylacetamide; this latter process can, for example, be utilised if the desired application of the polymer requires the use of a solution.

For numerous uses it is advantageous to carry out such a process in two stages; in a first stage, a prepolymer is prepared by heating an intimate mixture of the two reagents to a temperature of the order of 100° to 250° C. The prepolymer obtained can be used in the form of a solution, a suspension or a powder or can be shaped by simple casting whilst hot. In a second stage, the curing of the prepolymer can be brought about by heating to temperatures of the order of 350° C, optionally under pressure.

The present invention relates to thermosetting compositions which comprise the reaction product of (a) at least one N,N'-bis-imide of an unsaturated dicarboxylic acid, of general formula

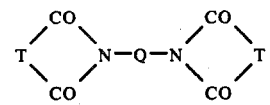 (I)

in which T represents a divalent organic radical containing a carbon-carbon double bond and Q is a divalent organic radical of 2 to 30 carbon atoms, (b) at least one polyamine of general formula

 (II)

in which R represents an organic radical of valency x, and x is an integer at least equal to 2, the bis-imide being present in an amount from 0.55 to 25 moles per molar -NH$_2$ group introduced by the polyamine, and (c) at least one monomer, other than a bis-imide of formula (I), which contains a carbon-carbon double bond and is heat-polymerisable.

The radical T is derived from an anhydride of an ethylenic dicarboxylic acid of general formula

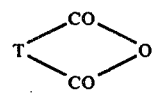 (III)

such as maleic anhydride, citraconic anhydride, itaconic anhydride, pyrochinconic anhydride and dichloromaleic anhydride as well as the Diels-Alder reaction products of one of these anhydrides with an acyclic, alicyclic or heterocyclic diene. As regards the anhydrides resulting from such a diene synthesis, reference may be made to for example, volume IV of "Organic Reactions" (John Wiley and Sons, Inc.); tetrahydrophthalic anhydride and endomethylene-tetrahydrophthalic anhydride should, in particular, be mentioned.

The radical Q can, for example, represent a linear or branched alkylene radical having less than 13 carbon atoms, a phenylene or cyclohexylene radical, or

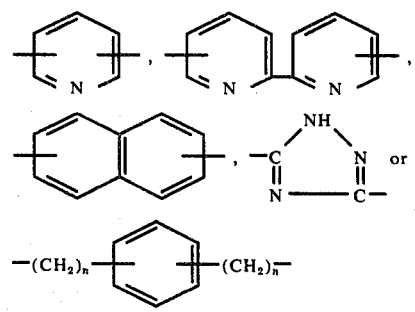

radical wherein n represents an integer from 1 to 3.

The radical Q can also contain more than one phenylene or cyclohexylene radical linked together either by a simple valency bond or by an inert atom or group such as —O—, —S—, an alkylene group having from 1 to 3 carbon atoms, —CO—, —SO$_2$—, —NR$_1$—, —M=N—, —CONH—, —COO—, —P(O)R$_1$—, —CONH—X—NHCO—,

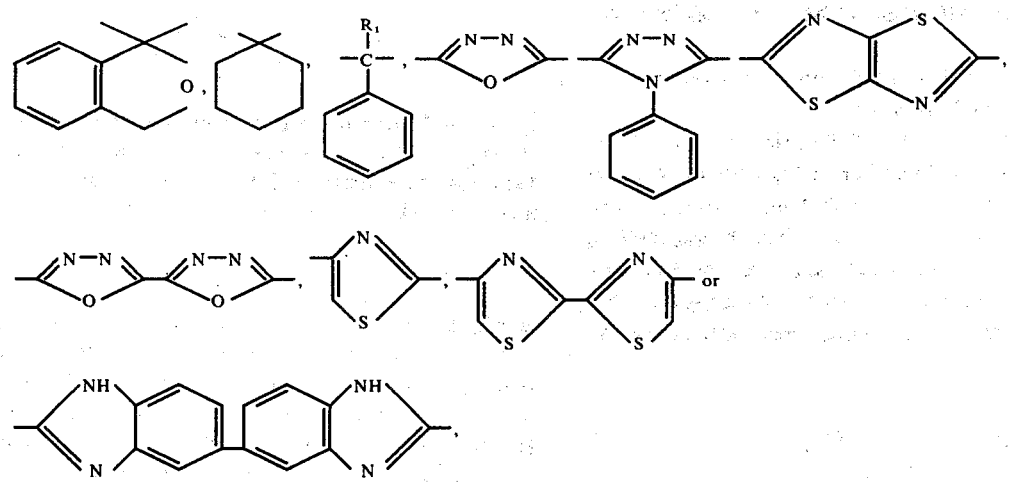

wherein $R_1$ represents a hydrogen atom, an alkyl radical having from 1 to 4 carbon atoms, a phenyl or a cyclohexyl radical, and X represents an alkylene radical having less than 13 carbon atoms. The various phenylene or cyclohexylene radicals can be substituted by methyl groups.

Specific examples of bis-imides (a) which may be used include: N,N'-ethylene-bis-maleimide, N,N'-hexamethylene-bis-maleimide, N,N'-meta-phenylene-bis-maleimide, N,N'-para-phenylene-bis-maleimide, N,N'-4,4'-diphenylmethane-bis-maleimide, N,N'-4,4'-diphenyl-ether-bis-maleimide, N,N'-4,4'-diphenylsulphone-bis-maleimide, N,N'-4,4'-dicyclohexylmethane-bis-maleimide, N,N'-α,α'-4,4'-dimethylenecyclohexane-bis-maleimide, N,N'-meta-xylylene-bis-maleimide, N,N'-para-xylylene-bis-maleimide, N,N'-4,4'-diphenylcyclohexane-bis-maleimide, N,N'-meta-phenylene-bis-tetrahydrophthalimide, N,N'-4,4'-diphenylmethane-bis-citraconimide, N,N'-4,4'-(1,1-diphenyl-propane)-bis-maleimide, N,N'-4,4'-triphenylmethane-bis-maleimide, N,N'-4,4'-(1,1,1-triphenylethane)-bis-maleimide and N,N'-3,5-triazole-1,2,4-bis-maleimide. These bis-imides can be prepared by, for example, the methods described in U.S. Pat. No. 3,018,290 and British Pat. Specification No. 1,137,592.

The polyamine (II) is suitably a di-primary diamine of general formula

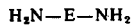 (III)

in which E represents one of the radicals which Q may represent. Examples of di-primary diamines which may be used, include 4,4'-diamino-dicyclohexylmethane, 1,4-diamino-cyclohexane, 2,6-diamino-pyridine, meta-phenylenediamine, paraphenylenediamine, 4,4'-diamino-diphenylmethane, 2,2-bis(4-aminophenyl)-propane, benzidine, 4,4'-diamino-phenyl ether, 4,4'-diamino-phenyl sulphide, 4,4'-diamino-diphenyl-sulphone, bis-(4-aminophenyl)methylphosphine oxide, bis(4-aminophenyl)-phenylphosphine oxide, bis(4-aminophenyl)methylamine, 1,5-diaminonaphthalene, meta-xylylenediamine, para-xylylenediamine, 1,1-bis(-para-aminophenyl)-phthalene, hexamethylenediamine, 6,6'-diamino-dipyridyl-2,2', 4,4'-diamino-benzophenone, 4,4'-diamino-azobenzene, bis(4-aminophenyl)-phenylmethane, 1,1-bis(4-aminophenyl)-cyclohexane, 1,1-bis(4-amino-3-methylphenyl)-cyclohexane, 2,5-bis(m-aminophenyl)-oxadiazole-1,3,4, 2,5-bis(p-aminophenyl)-oxadiazole-1,3,4, 2,5-bis(m-aminophenyl)-thiazole(4,5-d)thiazole, 5,5' di(m-aminophenyl)-(2,2'-bis-(oxadiazolyl-1,3,4), 4,4'-bis-(p-aminophenyl)-dithiazolo-2,2', m-bis[(4-p-aminophenyl)thiazolyl-2]benzene, 2,2'-bis(m-aminophenyl)5,5'-dibenzimidazole, 4,4'-diamino-benzanilide, phenyl-4,4'-diamino-benzoate, N,N'-bis(4-aminobenzoyl)p-phenylenediamine, 3,5-bis(m-aminophenyl)-4-phenyl triazole-1,2,4, N,N'-bis(p-aminobenzoyl)-4,4'-diaminodiphenylmethane, bis-p-(4-aminophenoxycarbonyl)benzene, bis-p-(4-aminophenoxy)-benzene, 3,5-diamino-triazole-1,2,4, 1,1-bis(4-aminophenyl)-1-phenylethane and 3,5-bis(aminophenyl)-pyridine.

Polyamines (II) which may be used, other than the di-primary diamines, include those which possess less than 50 carbon atoms and 3 to 5 —NH₂ groups per molecule. The —NH₂ groups can be carried by a benzene nucleus, which is optionally substituted by methyl groups, or by a naphthalene, pyridine or triazine nucleus; they can also be carried by several benzene nuclei linked to one another by a simple valency bond or by an inert atom or group which can be one of those described above in connection with the definition of the radical Q, or can be

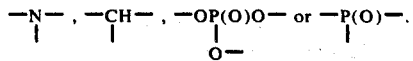

Examples of such polyamines include 1,2,4-triaminobenzene, 1,3,5-triamino-benzene, 2,4,6-triamino-toluene, 2,4,6-triamino-1,3,5-trimethyl-benzene, 1,3,7-triamino-naphthalene, 2,4,4'-triamino-diphenyl, 2,4,6-triamino-pyridine, 2,4,4'-triamino-phenyl ether, 2,4,4'-triamino-diphenylmethane, 2,4,4'-triamino-diphenyl-sulphone, 2,4,4'-triamino-benzophenone, 2,4,4'-triamino-3-methyldiphenylmethane, N,N,N-tri(4-aminophenyl)amine, tri(4-aminophenyl)methane, 4,4',4''-triamino-phenyl orthophosphate, tri(4-aminophenyl)phosphine oxide, 3,5,4'-triamino-benzanilide, melamine, 3,5,3',5'-tetraamino-benzophenone, 1,2,4,5-tetra-amino-benzene, 2,3,6,7-tetraamino-naphthalene, 3,3'-diamino-benzidene, 3,3',4,4'-tetraamino-phenyl ether, 3,3',4 '-tetraamino-diphenylmethane, 3,3',4,4'-tetraaminodiphenylsulphone, 3,5-bis(3,4'-diamino-phenyl)-pyridine, and oligomers of the type:

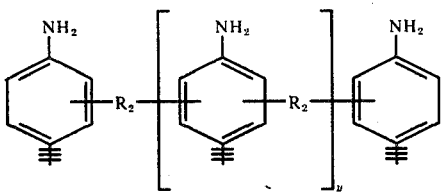

wherein y represents a number from 0.1 to about 2, $R_2$ represents a divalent hydrocarbon radical having from 1 to 8 carbon atoms, derived from an aldehyde or ketone of the formula: $R_2=O$ in which the oxygen atom is attached to a carbon atom of the radical $R_2$. Typical aldehydes and ketones from which $R_2$ may be derived include formaldehyde, acetaldehyde, enanthaldehyde, benzaldehyde, acetone, methyl ethyl ketone, hexan-2-one, cyclohexanone and acetophenone. These amino group-containing oligomers can be obtained by known methods such as those described in French Pat. Nos. 1,430,977, 1,481,935 and 1,533,696; the crude mixtures of polyamines obtained by these processes can be enriched in one or more of its constituents, for example by distillation under reduced pressure.

Suitable monomers (c), which can be used, include monomers possessing at least one $CH_2 = C <$ group, which is polymerisable by heating, and which can be of the vinyl, maleic, allyl and acrylic type. These monomers may contain several $CH_2 = C <$ groups, provided that the double bonds are not in a conjugated position. In a particular monomer, these groups can belong to the same or to different types. It is to be understood that a mixture of copolymerisable monomers (c) may be used. The monomers which can be used include esters, ethers, hydrocarbons, substituted heterocyclic compounds, organo-metallic compounds and organometalloid metalloid compounds.

Suitable esters, which may be used, include vinyl, allyl, methallyl, crotyl, isopropenyl and cinnamyl esters derived from saturated or unsaturated aliphatic, or aromatic, monocarboxylic or polycarboxylic acids such as acetic, propionic, butyric, oxalic, malonic, succinic, adipic, sebacic, methacrylic, phenylacrylic, crotonic, maleic, fumaric, citraconic, tetrahydrophthalic, itaconic, acetylene-dicarboxylic, benzoic, phenylacetic, orthophthalic, terephthalic, isophthalic and trimellitic acids, as well as the esters of non-polymerisable alcohols, such as the benzyl, isopropyl and 2-ethyl-hexyl esters, derived from polymerisable acids such as those mentioned above. Typical examples of esters which may be used include allyl acetate, methyl acrylate and methacrylate, vinyl methacrylate, allyl maleate, allyl fumarate, allyl phthalate, allyl malonate, triallyl trimellitate and allyl trimesate.

Suitable ethers, which can be used, include vinyl-allyl-ether, allyl-ether, methallyl-ether and allyl-crotyl-ether.

Amongst substituted heterocyclic compounds there may be mentioned the vinylpyridines, N-vinylpyrrolidone, N-vinylcarbazole, allyl isocyanurate, allyl cyanurate, vinyltetrahydrofurane, vinyldibenzofurane, allyloxytetrahydrofurane and N-allylcaprolactam.

Hydrocarbons such as styrene, alpha-methylstyrene, p-chlorostyrene, divinylbenzene, diallylbenzene and vinyltoluene can be used.

The monomeric organo-metallic and organo-metalloid derivatives, which may be used are in particular those which contain one or more atoms of phosphorus, boron or silicon. These can be vinyl, and allyl silanes or siloxanes, phosphines, phosphine oxides or phosphine sulphides, phosphates, phosphites, phosphonates, boranes, orthoborates, boronates, boroxoles, borazoles and phosphazenes. By way of example, there may be mentioned 1,3-diallyl-tetramethyldisiloxane, phenyldimethylallylsilane, allyldimethylphosphine oxide, allyl orthophosphate, allyl methylphosphonate, triallylborazole, triallylboroxole and triallyltrichlorophosphazene.

The monomers of the various categories set out above can contain halogen atoms, especially chlorine or fluorine, or functional groups such as an alcoholic or phenolic hydroxyl group, an aldehyde or ketone carbonyl group, or an amido, epoxy or nitrile group.

Examples of polymerisable monomers possessing such substituents include allyloxyethanol, p-allyloxyphenol, tetraallylepoxyethane, glycidyl acrylate, glycidyl methacrylate, allyl-glycidyl-ether, p-cyanostyrene, acrylamide, N-methylacrylamide, N-allylacrylamide, N-methylolacrylamide, methyl-allyl-ketone, acrylonitrile, methylacrylonitrile, p-chlorostyrene, p-fluorostyrene and beta-hydroxyethyl-diallyl-cyanurate.

The compositions of this invention can be prepared by heating the bis-imide (a), the polyamine (b) and the monomer (c) until a homogeneous liquid mixture is obtained. The temperature used will naturally vary depending on the physical state of the compounds present but is generally between 50° C. and 180° C. It is advantageous to maintain the starting compounds as an intimate mixture before and during heating. Depending on the physical characteristics of the ingredients, this may involve the usual techniques for mixing finely divided solids or of producing a suspension of one or more of the ingredients in the others, which are kept in the liquid state. Thus, the mixture of polyamine and monomer can be liquefied and the bis-imide then dispersed in this liquid mixture.

According to a particular embodiment, a prepolymer is first prepared from the bis-imide and the polyamine, and this prepolymer is then heated with the monomer under the conditions indicated above. The prepolymer can be obtained by heating the bis-imide and the polyamine, optionally intimately mixed beforehand, at for example, between 50° C and 250° C. The process can be carried out in bulk or in a polar solvent such as cresol, dimethylformamide, N-methylpyrrolidone, dimethylacetamide or chlorobenzene. The prepolymers preferentially employed are those of melting point between 50° C. and 150° C. To obtain these it is generally sufficient to heat the bis-imide and the polyamine at between 50° C. and 180° C. for several minutes to several hours, the time employed being shorter the higher the temperature employed.

It is to be appreciated that a single bis-imide or a mixture of several bis-imides can be used. Equally, the term "polyamine" is used herein to refer to single polyamines, to mixtures of polyamines of the same functionality and to mixture of polyamines of which at least two possess different functionalities. In general, one or more di-primary diamines are used, optionally combined with one or more polyamines of higher functionality which can suitably represent up to 50% by weight of the weight of diamines used. The amounts of the reagents are preferably so chosen that there are 0.6 to 2.5 mols of bis-imide per molar —$NH_2$ group introduced by the polyamine.

As regards the amount of monomer, it is preferred that this should represent less than 60%, and generally from 5 to 50%, of the total weight of the two other constituents.

The compositions of this invention can be prepared in the presence of catalysts usually employed in the polymerisation of the various types of monomer (c). In this connection, reference may be made to for example, HOUBEN-WEYL, Methoden der Organischen Chemie, volume XIV/1.

Apart from the reaction product of the bis-imide, the polyamine and the polymerisable monomer, the compositions according to the invention can also contain, as an adjuvant, an aromatic compound (d) which possesses from 2 to 4 benzene rings, which is not sublimable up to 250° C. at atmospheric pressure, and which has a boiling point above 250° C; the addition of these aromatic compounds makes it possible, in particular, to extend the period for which the compositions can be used in the fused state. In these aromatic compounds (d), the benzene rings can form condensed nuclei, or can be joined to one another by a valency bond or by an inert atom or group such as

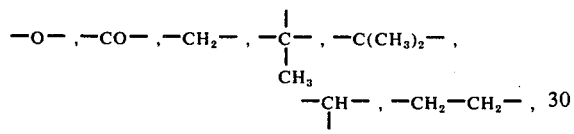

it being understood that in one and the same compound the overall bonding of the rings can be effected by a combination of these different types of bonding. The benzene rings can be substituted by inert radicals such as —CH$_3$, —OCH$_3$, —F, —Cl and —NO$_2$. Suitable compounds (d), which may be used in particular, include the isomeric terphenyls, the chlorinated diphenyls, phenyl ether, 2,2'-naphthyl ether, o-methoxyphenyl ether, benzophenone, 2,5,4'-trimethyl-benzophenone, p-phenylbenzophenone, p-fluorobenzophenone, diphenylamine, diphenylmethylamine, triphenylamine, azobenzene, 4,4'-dimethyl-azobenzene, azoxybenzene, diphenylmethane, 1,1-diphenyl-ethane, 1,1-diphenylpropane, triphenylmethane, diphenylsulphone, phenyl sulphide, 1,2-diphenyl-ethane, p-diphenoxybenzene, 1,1-diphenyl-phthalane, 1,1-diphenyl-cyclohexane, phenyl benzoate, benzyl benzoate, p-nitrophenyl terephthalate and benzanilide. The compositions preferably contain up to 10% by weight of aromatic compound (d), which can be added to the reaction product of the constituents (a), (b) and (c) or can be introduced at any time during this reaction.

In the form of a homogeneous liquid, the compositions of this invention, and in particular those wherein monomer (c) is an allyl derivative, can be used directly, for example for impregnating conductors or for moulding by simple casting whilst hot. It is also possible, after cooling, and grinding, to use these compositions in the form of powders, for example to obtain compression moulded articles, optionally in combination with fibrous or pulverulent fillers. The compositions can also be used in solution, to prepare coatings, adhesives, and laminated materials in which the substrate may be based on inorganic, vegetable or synthetic fibres.

The compositions of the invention can thereafter be cured by heating to temperatures of the order of 100° to 280° C.

The following Examples further illustrate the invention.

EXAMPLE 1 a. 89.5 g of N,N'-4,4'-diphenylmethane-bis-maleimide and 19.8 g. of bis(4-aminophenyl)methane were intimately mixed, and the mixture then left for 12 minutes in a chamber heated to 150° C. After cooling, the prepolymer was finely ground. It melted at 57° C.

b. 5 g of allyl ortho-phthalate were added to 45 g of this prepolymer powder, and the whole was then kept for 20 minutes, with stirring, in a bath heated to 150° C.

The liquid composition thus obtained was cast into a parallelepiped mould (125 × 75 × 6 mm), the internal wall of which had a polytetrafluoroethylene lining, previously heated to 100° C. The whole was left for 2 hours in a chamber heated to 200° C, and the material was then removed from the mould at 150° C. The moulded article was subjected to a supplementary heat treatment for 24 hours at 250° C.

It then had a flexural breaking strength (F.B.S.), at 25° C, of 16 kg/mm$^2$ (span = 25.4 mm) and at 250° C, of 6.6 kg/mm$^2$. After heat exposure at 300° C for 300 hours the F.B.S. was still 12.2 kg/mm$^2$ at 25° C.

EXAMPLE 2

A mixture of 130.2 g of bis(4-aminopheny)methane and 360 g of allyl ortho-phtalate was prepared and then heated to 160° C in a heated bath. When the mixture had liquefied, 590 g of N,N'-4,4'-diphenylmethane-bis-maleimide were added gradually over 10 minutes, whilst stirring, and the mixture was then kept at 160° C. for 20 minutes. A homogeneous liquid composition was obtained, which was cooled to 70° C.

A part of this composition was used to coat a satin type glass fiber fabric of specific weight 308 g/m$^2$, which was pre-treated with γ-aminopropyltriethoxysilane. After coating, the fabric was kept for 30 minutes in a chamber heated to 150° C.

After cooling, rectangular samples were cut from this fabric and assembled to form a laminate. This laminate was thereafter compressed under 15 kg/cm$^2$, and then heated in this form from 120° C to 200° C over 1 hour, and then at 200° C. for 1 hour.

The laminate obtained contained 18% by weight of resin and had a flexural breaking strength of 64.2 kg/mm$^2$ at 25° C, and 58.2 kg/mm$^2$ at 200° C. After a heat test for 200 hours at 200° C, the F.B.S. was still 62.3 kg/mm$^2$ at 25° C.

EXAMPLE 3

36.8 g of N,N'-4,4'-diphenylmethane-bis-maleimide and 8.2 g of bis(4-aminophenyl)methane were intimately mixed, and 5 g of allyl cyanurate then added. The mixture was then heated to 150° C. and kept under these conditions, whilst stirring, for 21 minutes.

The liquid composition thus obtained was cast in the mould described in Example 1. The whole was thereafter kept in a chamber at 200° C. for 2 hours. After cooling, the article was removed from the mould and heated at 200° C. for 24 hours. The article had a flexural breaking strength, at 25° C, of 14.7 kg/mm$^2$ and at 250° C of 11 kg/mm$^2$. After heat exposure at 250° C for 1000 hours, the F.B.S. was still 8.9 kg/mm$^2$ (measured at 25° C).

EXAMPLE 4

1.79 g of bis(4-aminophenyl)methane were heated with 1.1 g of 4-vinylpyridine until a homogeneous liquid was obtained, to which 8.11 g of N,N'-4,4'-diphenylmethane-bis-maleimide were then added. The whole was then heated, whilst stirring, in a bath maintained at 150° C. After 2 minutes, a liquid composition was obtained, which was poured into a "Pyrex" beaker, the inner wall of which was lined with aluminium foil. The whole was kept in a chamber heated to 200° C for 16 hours. After removal from the mould, test specimens of size 40 × 4.5 × 4 were cut from the article; these had a flexural breaking strength of 13.3 kg/mm$^2$ at 25° C, and at 250° C of 8.1 kg/mm$^2$.

EXAMPLE 5

The experiment described in Example 4 was repeated, replacing the 4-vinylpyridine by an identical weight of N-vinylpyrrolidone, the liquid composition being obtained by heating to 150° C for 4 minutes. Finally, a moulded article was obtained which at 25° C had a flexural breaking strength of 12.3 kg/mm$^2$ and a 250° C, of 10.9 kg/mm$^2$.

EXAMPLE 6

A mixture of 8.2 g of bis(4-aminophenyl)methane and of 5 g of styrene was liquefied by heating, and 36.8 g of N,N'-4,4'-diphenylmethane-bis-maleimide were then added whilst stirring. The whole was kept at 150° C for 10 minutes, with stirring. The liquid composition thus obtained was cast in the mould described in Example 1, previously heated to 100° C. The whole was heated for 2 hours in a chamber heated to 200° C, and after removal from the mould the article was subjected to a heat treatment at 250° C. for 72 hours. It then had a flexural breaking strength of 17 kg/mm$^2$ at 25° C. After heat exposure at 250° C for 1,000 hours, the F.B.S. was still 13.5 kg/mm$^2$.

EXAMPLE 7

89.5 g of N,N'-4,4'-diphenylmethane-bis-maleimide and 19.8 g of bis(4-aminophenyl)methane were intimately mixed, and the mixture then left for 28 minutes in a chamber heated to 150° C. After cooling, the prepolymer obtained was finely ground. It melted at 98° C.

b. 6.2 g of glycidyl acrylate were added to 8.8 g of this prepolymer, and the whole was then stirred for 20 minutes in a bath heated to 100° C.

The liquid composition thus obtained was poured into a "Pyrex" beaker internally lined with an aluminium foil, and the whole was then kept at 100° C for 1 hour, then at 150° C for 2 hours and finally at 200° C for 2 hours. After removal from the mould, an article was obtained which at 25° C had a flexural breaking strength of 10.5 kg/mm$^2$.

EXAMPLE 8

The procedure indicated in Example 7 is followed, starting from 10 g of prepolymer and 3.5 g of glycidyl acrylate. After shaping, the composition was heated at 100° C for 1 hour, then at 150° C for 1 hour and finally at 200° C for 1½ hours. The article obtained had a flexural breaking strength of 16.7 kg/mm$^2$ at 25° C.

EXAMPLE 9

A mixture of 1.8 g of bis(4-aminophenyl)methane and 3.9 g of glycidyl methacrylate was liquefied by heating to 100° C, and 8.1 g of N,N'-4,4'-diphenylmethane-bis-maleimide were then added thereto, with stirring. A liquid composition was obtained by heating the whole to 140° C. for 3 minutes, whilst stirring. The composition was cast into a "Pyrex" beaker lined with an aluminium foil and the whole was heated to 100° C for 1 hour, then to 150° C for 1 hour, and finally to 200° C for 1½ hours. After removal from the mould, an article was obtained which, at 25° C, had a flexural breaking strength of 17.3 kg/mm$^2$.

EXAMPLE 10 a. 55.3 g of N,N'-4,4'-diphenylmethane-bis-maleimide, 12.2 g of bis(4-aminophenyl)methane and 7.5 g of triallyl trimellitate were intimately mixed. The mixture was heated to 150° C and kept under these conditions for 10 minutes, whilst stirring.

The liquid composition thus obtained was cast in the mould described in Example 1 which had previously been heated to 100° C. The whole was thereafter kept in a chamber at 200° C for 2 hours. After cooling and removal from the mould, the article was subjected to a heat treatment at 200° C for 24 hours and then at 250° C for the same period. At the end of this treatment, it had a flexural breaking strength of 11.9 kg/mm$^2$ at 25° C. After a heat test at 250° C for 1,500 hours, the F.B.S. was still 10.4 kg/mm$^2$ at 25° C; and, at 250° C was 8 kg/mm$^2$.

b. The experiment described in Example 10 a) was repeated, but using:

49.2 g of N,N'-4,4'-diphenylmethane-bis-maleimide 10.8 g of bis(4-aminophenyl)methane and 15 g of triallyl trimellitate.

The following values (in kg/mm$^2$) were obtained for the flexural breaking strength:

|  | at 25° C | at 250° C |
|---|---|---|
| initial values | 13 | 8.2 |
| after a heat exposure at 250° C for 1,500 hours | 9.1 | 8.8 |

EXAMPLE 11

The experiment described in Example 4 was repeated, but replacing the 4-vinylpyridine with 1.1 g of phenylallyldimethylsilane and heating the mixture to 130° C. After casting the liquid composition, the whole was heated to 150° C for 1 hour, then at 200° C for the same period. The article had a flexural breaking strength of 12.3 kg/mm$^2$ at 25° C.

EXAMPLE 12

60.7 g N,N'-4,4'-diphenylmethane-bis-maleimide was intimately mixed with 14.2 g. of a polyamine having the average formula

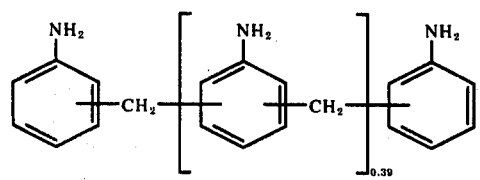

and 7.5 g of an allylic compound. The temperature of the mixture was raised to 150° C and maintained at this temperature with agitation for 10 minutes.

The liquid composition thus obtained was cast in a mould as described in Example 1 and the composite was maintained at 200° C for 2 hours. After cooling, the object was removed from the mould and then subjected to a thermal treatment at 200° C for 24 hours and then at 250° C for the same period.

The table below gives, for each allylic compound used the flexural breaking strength, measured at 25° C ($Rf_{25}$) at 200° C ($Rf_{200}$) and 250° C ($Rf_{250}$).

| Allylic compound | $Rf_{25}$ | $Rf_{200}$ | $Rf_{250}$ |
|---|---|---|---|
| Allyl phthalate | 13.2 | 9.8 | 7.9 |
| Triallyl trimellitate | 11.2 | 9.4 | 8.9 |

We claim:

1. A thermosetting composition which consists essentially of the reaction product obtained by heating between 50° and 180° C. (a) at least one N,N'-bis-imide of an unsaturated dicarboxylic acid, of general formula:

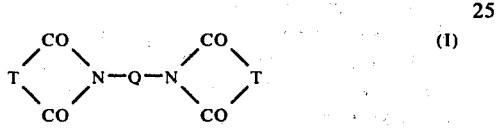

in which T represents a divalent organic radical containing a carbon-carbon double bond derived from an ethylenic dicarboxylic acid anhydride of formula:

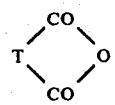

and Q is a divalent organic radical of 2 to 30 carbon atoms, (b) at least one polyamine of general formula:

R (NH$_2$)$_x$ in which x is an integer from 2 to 5, and R represents an organic radical of valency x, the bis-imide being present in an amount from 0.55 to 25 mols per molar -NH$_2$ group of the polyamine, and (c) 5 to 60% by weight, based on the combined weight of (a) and (b) of at least one monomer possessing at least one vinyl, allyl or acrylic CH$_2$=C< group and polymerisable by heat, selected from the group consisting of a vinyl ester of an acid selected from the group consisting of acetic, propionic, butyric, oxalic, malonic, succinic, adipic, sebacic, acrylic, methacrylic, phenylacrylic, crotonic, maleic, fumaric, citraconic, tetrahydrophthalic, itaconic, acetylene dicarboxylic, benzoic, phenylacetic, orthophthalic, terephthalic, isophthalic and trimellitic acid, an allyl ester of an acid selected from the group consisting of acetic, propionic, butyric, oxalic, malonic, succinic, adipic, sebacic, acrylic, methacrylic, phenylacrylic, crotonic, maleic, fumaric, citraconic, tetrahydrophthalic, itaconic, acetylene dicarboxylic, benzoic, phenylacetic, orthophthalic, terephthalic, isophthalic and trimellitic acid, methyl acrylate, methyl methacrylate, styrene, α-methylstyrene, para-chlorostyrene, divinylbenzene, diallylbenzene, vinyl toluene, a vinyl allyl ether, a methallyl ether, a vinyl pryidine, N-vinylpyrrolidone, allyl isocyanurate, allyl cyanurate, a silane containing a group selected from the group consisting of vinyl and allyl, a siloxane containing a group selected from the group consisting of vinyl and allyl, glycidyl acrylate, and glycidyl methacrylate.

2. The composition according to claim 1 in which the monomer (c) is an allylic compound.

3. The composition according to claim 1, in which the monomer (c) is present in an amount from 5 to 50% by weight of the total weight of bis-imide and polyamine.

4. The composition according to claim 1 in which the bis-imide is present in an amount from 0.6 to 2.5 mols per molar -NH$_2$ group of the polyamine.

5. The composition according to claim 1 in which the polyamine is a di-primary diamine of general formula

H$_2$N — E — NH$_2$ in which E represents a divalent organic radical of 2 to 30 carbon atoms.

6. The composition according to claim 5 in which E represents a

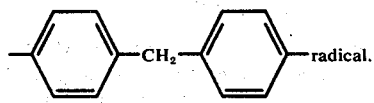

7. The composition according to claim 1 in which Q represents a

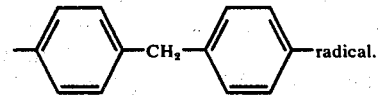

8. The cured thermoset resin obtained by heating a composition as claimed in claim 1 to a temperature from 100° to 280° C.

9. The composition according to claim 3 in which Q represents a linear or branched alkylene radial having less than 13 carbon atoms, a phenylene or cyclohexylene radical, or a phenylene or cyclohexylene radical substituted by a methyl group, or a

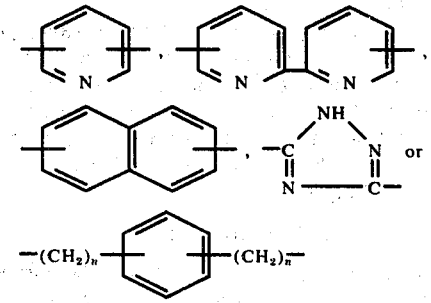

radical wherein n represents an integer from 1 to 3, or more than one phenylene, cyclohexylene, methyl-substituted phenylene or methyl-substituted cyclohexylene radical, linked together either by a simple valency bond or by an inert atom or group selected from the group consisting of —O—, —S—, an alkylene group having from 1 to 3 carbon atoms, —CO—, —SO$_2$—, NR$_1$—,

—N=N—, —CONH—, —COO, —P(O)R₁—, —CONH—X—NHCO—, ylene radical, or phenylene or cyclohexylene radical substituted by a methyl group, or a

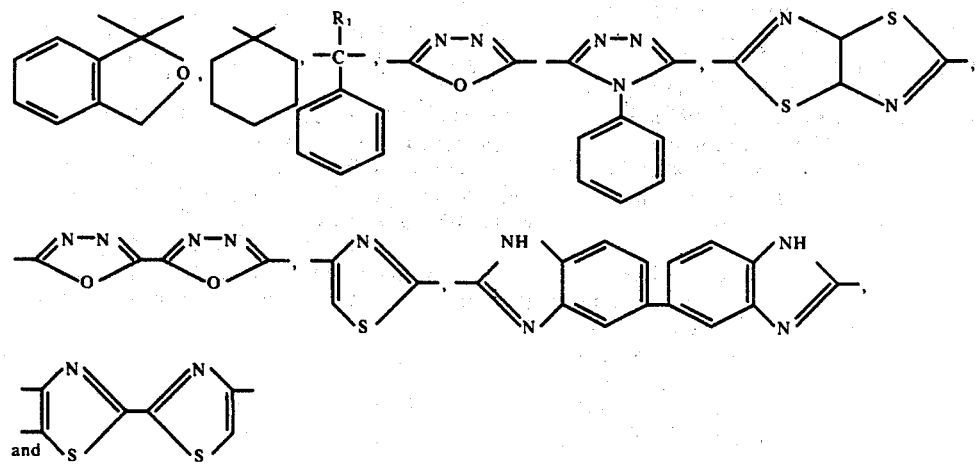

wherein R₁ represents a hydrogen atom, an alkyl radical having from 1 to 4 carbon atoms, a phenyl or cyclohexyl radical, or a phenyl or cyclohexyl radical substituted by a methyl group, and X represents an alkylene radical having less than 13 carbon atoms.

10. The composition according to claim 3 in which the bis-imide is selected from the group consisting of N,N'-ethylene-bismaleimide, N,N'-hexamethylene-bismaleimide, N,N'-metaphenylene-bis-maleimide, N,N'-para-phenylene-bis-maleimide, N,N'-4,4'-diphenylmethane-bis-maleimide, N,N'-4,4'-diphenylester-bismaleimide, N,N'-4,4'-diphenylsulphone-bis-maleimide, N,N'-4,4'-dicyclohexylmethane-bis-maleimide, N,N'-α,α'-4,4'-dimethylene-cyclohexane-bis-maleimide, N,N'-meta-xylylene-bismaleimide, N,N'-paraxylylene-bis-maleimide, N,N'-4,4'-diphenylcyclohexane-bis-maleimide, N,N'-meta-phenylene-bistetrahydrophthalimide, N,N'-4,4'-diphenylmethane-biscitraconimide, N,N'-4,4'-(1,1-diphenyl-propane)-bismaleimide, N,N'-4,4'-triphenylmethane-bis-maleimide, N,N'-4,4'-(1,1,1-triphenylethane)-bis-maleimide or N,N'-3,5-triazole 1,2,4-bis-maleimide.

11. The composition according to claim 5 in which E

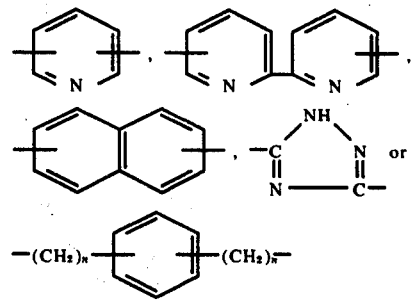

radical wherein n represents an integer from 1 to 3, or more than one phenylene or cyclohexylene radical, or phenylene or cyclohexylene radical substituted by a methyl group, linked together either by a simple valency bond or by an inert atom or group selected from the group consisting of —O—, —S—, an alkylene group having from 1 to 3 carbon atoms, —CO—, —SO₂—, —NR₁—, —N=N—, —CONH—, —COO—, —P(O)R₁—, —CONH—X—NHCO—,

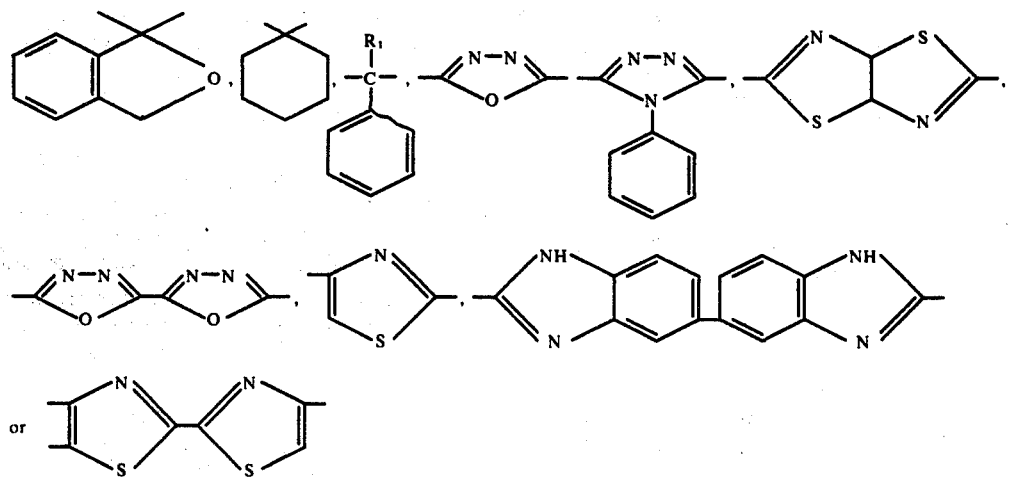

represents a linear or branched alkylene radical having less than 13 carbon atoms, a phenylene or cyclohexylene radical, or phenylene or cyclohexylene radical substituted by a methyl group, or a wherein R₁ represents a hydrogen atom, an alkyl radical having from 1 to 4 carbon atoms, a phenyl or a cyclohexyl radical, or a phenyl or cyclohexyl radical substituted by a methyl group, and X represents an alkylene radical having less than 13 carbon atoms.

12. A composition according to claim 1 in which the monomer (c) is selected from the group consisting of allyl ortho-phthalate, allyl cyanurate, triallyl mellitate and phenyl allyl dimethylsilane.

13. A composition according to claim 1 in which the monomer (c) is selected from the group consisting of 4-vinylpyridine, N-vinyl pyrrolidone and styrene.

14. A composition according to claim 1 in which the monomer (c) is selected from the group consisting of glycidyl acrylate and glycidyl methacrylate.

15. The filled composition of claim 14.

16. A composition according to claim 1 in which the polyamine contains 3 to 5 —NH$_2$ groups per molecule and less than 50 carbon atoms, said —NH$_2$ groups being carried by a benzene nucleus, a benzene nucleus which is substituted by methyl groups or by a naphthalene, pyridine or triazine nucleus or by several benzene nuclei linked to one another by a valency bond or by an inert atom or group selected from the group consisting of —O—, —S—, an alkylene group having from 1 to 3 carbon atoms, —CO—, —SO$_2$—, —NR$_1$—, —N=N—, —CONH—, —COO—, —P(O)R$_1$—, —CONH—X—NHCO—, 18. A composition according to claim 1 which also contains up to 10% by weight of an aromatic compound (d) containing 2 to 4 benzene rings having a boiling point above 250° C. and which is not sublimable up to 250° C. at atmospheric pressure.

19. The composition according to claim 1 in which component (c) is tri-allyl isocyanurate.

20. The composition according to claim 1 in which component (a) is N,N'-4,4'-diphenylmethane-bis-maleimide, component (b) is 4,4'-diaminodiphenylmethane and component (c) is tri-allyl isocyanurate.

21. A resinous composition consisting essentially of the polyimide reaction product of bis-imide having the formula:

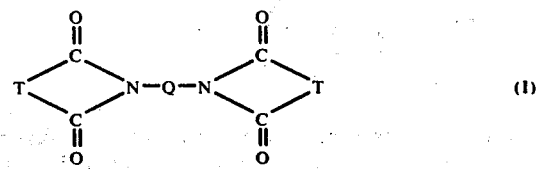

wherein T represents a divalent organic radical con-

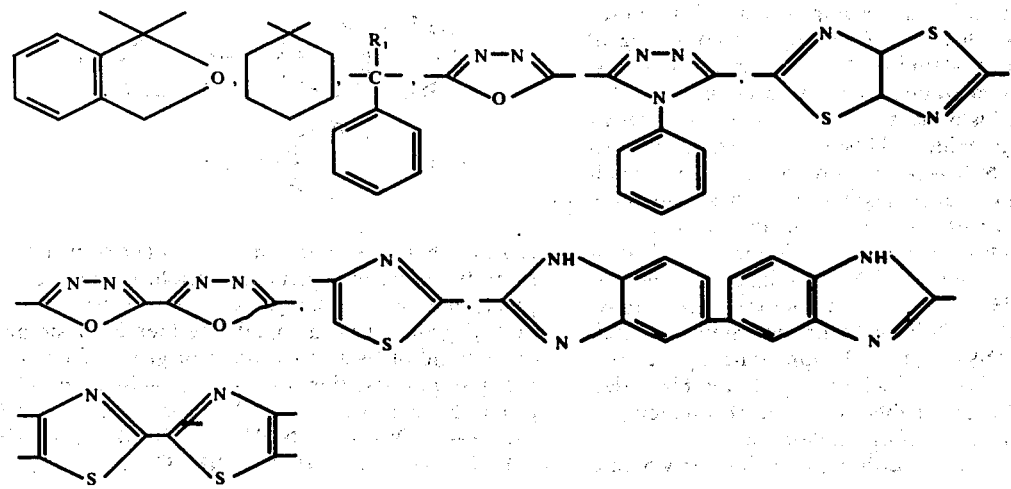

wherein R$_1$ represents a hydrogen atom, an alkyl radical having from 1 to 4 carbon atoms, a phenyl or a cyclohexyl radical or a phenyl or cyclohexyl radical substituted by a methyl group, and X represents an alkylene radical having less than 13 carbon atoms or

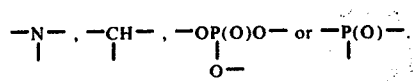

17. A composition according to claim 1 in which the polyamine is an oligomer of the formula:

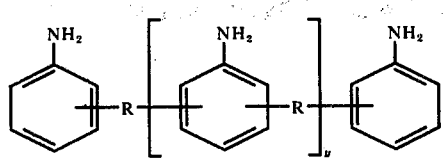

wherein y represents a number from 0.1 to about 2, R represents a divalent hydrocarbon radical having from 1 to 8 carbon atoms derived from an aldehyde or ketone of the formula: R=O in which the oxygen atom is attached to a carbon atom of the radical R.

taining a carbon-carbon double bond derived from an ethylenic dicarboxylic acid anhydride of the formula:

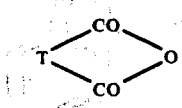

Q is a member selected from the class consisting of divalent organic radicals of at least 2 carbon atoms, and divalent groups consisting of two phenyl residues attached to each other through the medium of a member selected from the class consisting of an alkylene radical having from 1 to 3 carbon atoms,

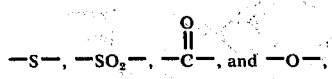

and a polyamine having the formula:

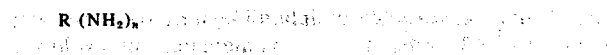

where R is an organic radical of valency $n$ and $n$ is an integer of at least 2, and monomer selected from the group consisting of diallyl phthalate and N-vinylpyrrolidone and mixtures thereof, said monomer being less than 60% by weight based on the weight of the bis-imide and polyamine.

22. The cured thermoset composition of claim 14.

23. A composition according to claim 21 in which said monomer comprises from 5 to 50% by weight based on the weight of the bis-imide and polyamine.

* * * * *